US011553341B2

(12) United States Patent
Garcia et al.

(10) Patent No.: US 11,553,341 B2
(45) Date of Patent: Jan. 10, 2023

(54) AUTHORIZATION ASSIGNMENT ON FIELD DEVICES

(71) Applicant: VEGA GRIESHABER KG, Wolfach (DE)

(72) Inventors: Juan Garcia, Biberach (DE); Ralf Hoell, Titisee-Neustadt (DE)

(73) Assignee: VEGA GRIESHABER KG, Wolfach (DE)

( * ) Notice: Subject to any disclaimer, the term of this patent is extended or adjusted under 35 U.S.C. 154(b) by 21 days.

(21) Appl. No.: 16/830,039

(22) Filed: Mar. 25, 2020

(65) Prior Publication Data
US 2020/0314652 A1 Oct. 1, 2020

(30) Foreign Application Priority Data

Mar. 25, 2019 (DE) ...................... 10 2019 204 077.2

(51) Int. Cl.
H04W 12/08 (2021.01)
H04W 88/06 (2009.01)
H04W 84/12 (2009.01)
H04W 4/80 (2018.01)

(52) U.S. Cl.
CPC ............. H04W 12/08 (2013.01); H04W 4/80 (2018.02); H04W 84/12 (2013.01); H04W 88/06 (2013.01)

(58) Field of Classification Search
CPC ...... H04L 63/107; H04W 12/08; H04W 4/38; H04W 4/80; H04W 84/12; H04W 88/06
See application file for complete search history.

(56) References Cited

U.S. PATENT DOCUMENTS

| 10,551,814 | B2* | 2/2020 | Sherriff | G05B 19/056 |
| 10,555,274 | B1* | 2/2020 | Roosli | H04W 24/08 |
| 2012/0192289 | A1* | 7/2012 | Gazdzinski | B66B 1/3415 726/28 |
| 2015/0042240 | A1* | 2/2015 | Aggarwal | H05B 47/19 315/292 |
| 2015/0112469 | A1* | 4/2015 | Da Silva Neto | G05B 19/41855 700/108 |
| 2015/0382198 | A1* | 12/2015 | Kashef | H04W 4/50 726/5 |

(Continued)

FOREIGN PATENT DOCUMENTS

| EP | 3 312 692 A1 | 4/2018 |
| EP | 3 647 887 A1 | 5/2020 |

OTHER PUBLICATIONS

German Office Action dated Jan. 30, 2020, in Patent Application No. 10 2019 204 077.2, 8 pages.

Primary Examiner — David Bilodeau
(74) Attorney, Agent, or Firm — Oblon, McClelland, Maier & Neustadt, L.L.P.

(57) ABSTRACT

A gateway for assigning an access authorization for a mobile operating device to a field device, including a first interface that wirelessly communicates with the mobile operating device, a second interface that communicates with an authorization assignment device, a memory device that stores an access authorization of the mobile operating device transmitted by the authorization assignment device, authorization assignment circuitry that reads the access authorization of the mobile operating device from the memory device and transmits the access authorization to the mobile operating device via the first interface.

13 Claims, 1 Drawing Sheet

(56) References Cited

U.S. PATENT DOCUMENTS

| | | | |
|---|---|---|---|
| 2016/0211985 A1* | 7/2016 | Castillo | F24F 11/62 |
| 2016/0241999 A1* | 8/2016 | Chin | G08C 23/04 |
| 2017/0052522 A1* | 2/2017 | Klein | H04L 63/0428 |
| 2018/0025304 A1* | 1/2018 | Fisher | G06Q 10/20 |
| | | | 726/4 |
| 2018/0278462 A1* | 9/2018 | Bjontegard | A63F 13/217 |
| 2020/0012249 A1* | 1/2020 | Altendorf | G05B 19/0426 |
| 2020/0211307 A1* | 7/2020 | Lanza | G07C 9/00182 |
| 2020/0273268 A1* | 8/2020 | Bhattacharyya | |
| | | | H04L 12/40169 |
| 2020/0300899 A1* | 9/2020 | Kramer | H05K 7/1462 |

\* cited by examiner

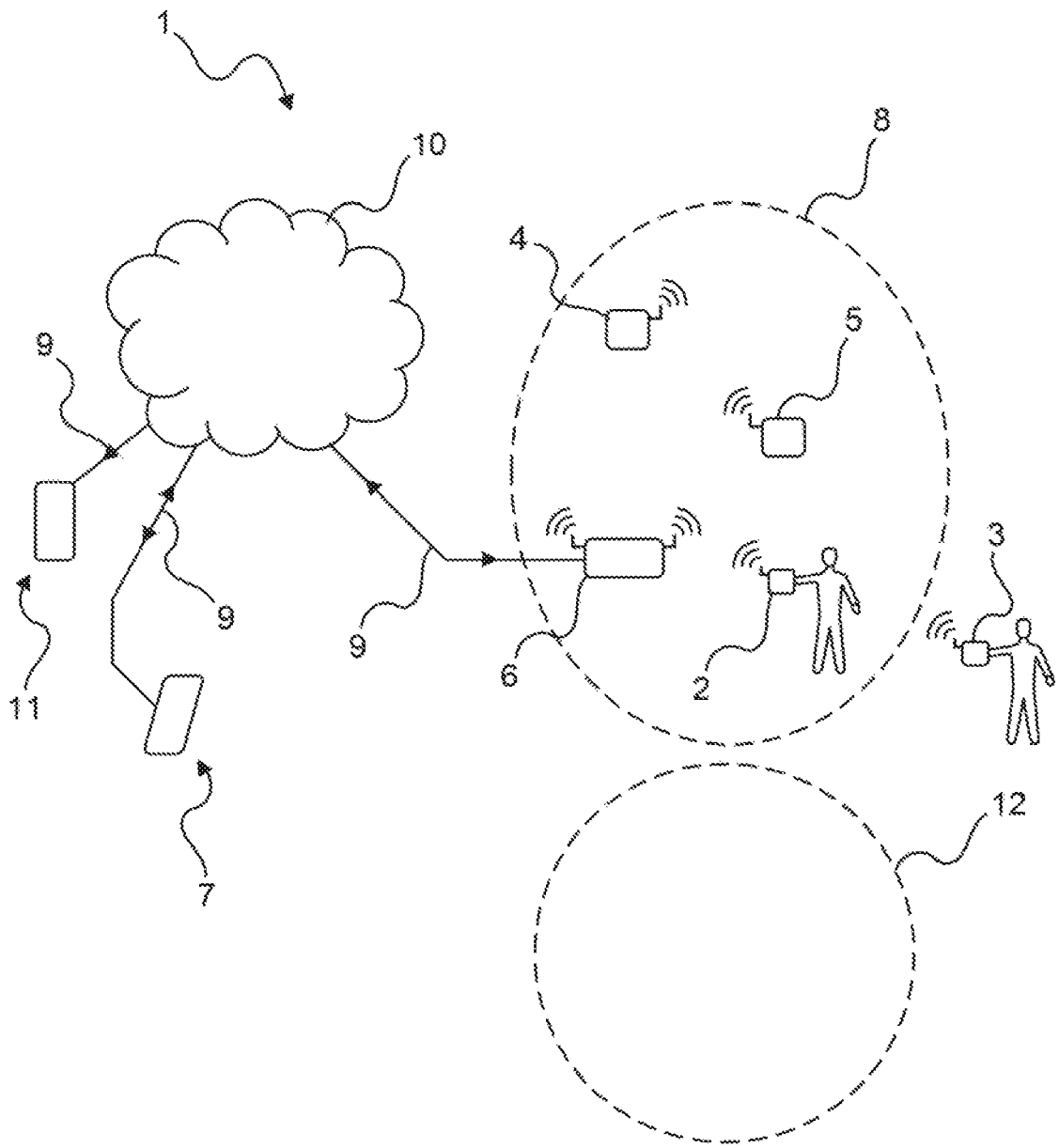

AUTHORIZATION ASSIGNMENT ON FIELD DEVICES

CROSS-REFERENCE TO RELATED APPLICATIONS

This application claims the benefit of the filing date of German Patent Application No. 10 2019 204 077.2 filed on 25 Mar. 2019 the entire contents of which are incorporated herein by reference.

FIELD

The present disclosure relates to a gateway for assigning an access authorization for a mobile operating device to a field device, a method for assigning an access authorization for a mobile operating device to a field device, and a system for assigning an access authorization for a mobile operating device to a field device.

BACKGROUND

Field devices are often used in process automation and the process industry to monitor and determine one or more process variables or measured variables. For example, field devices can be used to determine a pressure of a medium, a level of a medium, a flow rate of a medium, a flow velocity of a medium, a temperature, a limit level, a position control, a valve position or other process variables. Other known sensors can be vibration switches, valves or generally positioners. Field devices are increasingly being integrated into networks and networked with computers, smartphones, laptops or the like. These networked field devices can transmit measurement, parameterization or diagnostic data to computing, evaluation or visualization units.

Field devices can also be read out, parameterized or otherwise operated on site using mobile operating devices. For example, a field device can be accessed wirelessly using smartphones, tablets or similar devices. In doing so, unauthorized access to a field device must be prevented. Typically, different security mechanisms are therefore provided in the field devices or in the operating devices networked with the field devices. Such security mechanisms can be provided, for example, by an authentication procedure with which an operating device must log on to the field device. An operator who wants to access a field device with a mobile operating device must therefore have received an appropriate access authorization for such a field device before the operator is allowed to access the field device with the operating device.

Typically, such access authorizations or access information are transferred to the mobile operating device prior to an on-site access so that a corresponding on-site access to the field device can take place at a later time.

It has now become apparent that there is a further need to simplify the assignment of an access authorization for a mobile operating device to a field device. It is therefore the object to provide a simpler, e.g. automated, possibility to assign an access authorization for a mobile operating device to a field device. It is also the object to prevent unauthorized access to a field device by a mobile operating device.

These and other objects, which become apparent upon reading the following description, are solved by the subject matter of the independent claims. The dependent claims refer to embodiments developing the core idea of the present disclosure in a particularly advantageous way.

SUMMARY

The present disclosure provides a gateway for assigning an access authorization for a mobile operating device to a field device, the gateway comprising: a first interface, configured for wireless communication with an operating device; a second interface, configured for communication with an authorization assignment unit; a memory device, configured to store an access authorization of the operating device transmitted by the authorization assignment unit; authorization assignment means, configured to read the access authorization of the operating device from the memory device and to transmit it to the operating device via the first interface.

In other words, the present disclosure proposes a gateway which can communicate with an operating device via a first interface so that an access authorization can be transmitted from the gateway to the mobile terminal. The gateway receives the corresponding access authorization from a, e.g. central, authorization assignment unit with which the gateway can also communicate. The gateway is set up in such a way that an access authorization for a mobile operating device is automatically transmitted to the mobile operating device as soon as communication with the operating device is established. In this context, an authorization assignment unit is understood to be, in particular, a central computer unit which functions as an authorization assignment unit for several gateways. The gateways can be located at different locations, distributed worldwide. The gateway is located close to the respective field devices so that an access authorization for the mobile terminal is transmitted if the mobile terminal is located near or in the transmission/reception area of the respective field devices. In this context, an access authorization for the mobile terminal is understood to be a direct access of the mobile terminal to the field device.

In addition, the first interface is a Bluetooth interface or a Wireless Local Area (WLAN) interface. Furthermore, the second interface is a wired Ethernet interface, a mobile phone interface, a Long Range Wide Area (LoRaWAN) interface or a Low-Power Wide-Area Network (LPWAN) interface.

In an embodiment, the first interface is thus an interface for short-range communication, such as a Bluetooth communication, and the second interface is a long-range communication interface, such as a mobile radio interface. This makes it possible to place the gateway in the vicinity of the respective field devices, i.e. in an area where an operator must enter with his mobile terminal device anyway to access the respective field devices, whereby a corresponding access authorization is transmitted automatically to the respective authorized mobile terminal device as soon as wireless communication of the gateway with the mobile terminal device is possible.

In addition, the access authorization for an operating device is individualized and, in particular, selected from the following access authorizations: an access authorization limited to a defined period of time; an access authorization limited to a defined selection of field devices; an access authorization limited to defined functions of a field device; and/or an access authorization limited to a defined spatial area. In other words, the respective access authorization is adapted to the respective mobile operating device, i.e. that the rights for the respective mobile operating device are restricted in such a way that only the rights required by the respective operator are granted.

In particular, when assigning access authorization, a distinction can be made with respect to the depth of authorization. For example, only read-out access for diagnosis, access to certain parameter groups or complete operating release can be granted. It is also possible to lock a mobile operating device for certain or all field devices. Furthermore, it is possible to make access authorization dependent on whether wireless communication of the operating device with the gateway is maintained or whether access authorization is only granted for a certain period of time. Furthermore, it is possible to assign an access authorization depending on a position of the mobile operating device which is recorded, for example, by means of a GPS unit. In this respect, the wireless communication with the gateway is maintained in this case as well.

Furthermore, it is possible to transmit the position data of the mobile operating device directly or via the gateway to a central data processing unit as soon as the mobile operating device accesses the field device and is therefore located in the immediate vicinity of the operating device. This position data can then be used as estimated position data of the field device. In this way, a comparatively accurate estimate of the arrangement of the field devices can be obtained, which is also updated whenever an operator accesses a field device, so that a change in position of a field device can also be periodically recorded in a central data processing unit.

This makes it possible to make the access authorization of a mobile operating device to a field device dependent on various parameters and also to select the authorization level individually for each mobile operating device. As a result, the risk of unauthorized persons accessing field devices or of field devices being inadvertently operated incorrectly by an operator can be minimized, since functions of a field device that are not required by an operator are blocked or cannot be released and therefore cannot be set incorrectly by the operator.

A gateway according to an embodiment automatically transmits the respective access authorizations to a respective mobile operating device as soon as it is placed in the transmission/reception area of the gateway. This not only increases access security, but also saves a considerable amount of time. Furthermore, the authorization assignment unit is centrally located, for example as a cloud computer, and serves as a management device for several gateways. This makes it possible to manage the assignment of access authorizations for mobile operating devices centrally, securely, unambiguously and cost-effectively, and also with a high degree of flexibility.

The gateway includes a third interface for communication with one or more field devices, whereby the third interface is provided by the first interface, i.e. the close-range interface. In this context, the gateway only grants access authorization to those field devices that are connected to the gateway via the third interface. In this embodiment, the gateway thus only assigns access authorizations for field devices which are located in the wireless communication zone of the gateway.

Advantageously, the access authorization is linked to the condition that wireless communication between the gateway and the operating device and wireless communication between the gateway and the respective field device is maintained. In other words, in this embodiment, not only must an access authorization be transmitted from the gateway to the mobile operating device to access a field device, but at the same time, the operating device and the field device must be or remain connected to the gateway via an interface for wireless communication. In this way, the risk of unauthorized access to a field device can be significantly reduced.

In this respect, it should be noted that field devices which are not directly connected to the gateway via the third interface but are indirectly connected to the gateway, for example via field device-to-field device communication, can also be integrated and managed by the gateway, as an access authorization provider.

It is advantageous that the gateway is set up in such a way that it can receive and store process, parameter and/or diagnostic data from the field devices. In this context it is advantageous that the gateway comprises a fourth interface for communication with a central data processing unit in order to transmit the process, parameter and/or diagnostic data of the field devices to the central data processing unit. In this embodiment, the gateway therefore not only provides the respective access authorizations to the mobile operating devices, but can also be used as a data collection point for the respectively connected field devices, so that the respective process and/or diagnostic data can be transmitted to a central data processing unit more easily and reliably. The fourth interface for communication with a central data processing unit is provided by the second interface, i.e. the remote interface.

As already mentioned above, long-distance communication can be provided in particular by means of a wired Ethernet, a mobile radio, a low-power wide-area network (LPWAN) interface or a long-distance wide-area communication, whereby not only direct point-to-point solutions can be used, but also, for example, cloud solutions provided in between or communication with the central authorization assignment/allocation unit or the central data processing unit can take place via further gateways in between.

Advantageously, the gateway includes position determination means to transmit position data of the gateway to the authorization assignment unit and/or the central data processing unit. Possible position determination means are in particular GPS units, whereby a position can also be determined by triangulation, for example by means of mobile radio signals or other communication signals. This makes it possible to display a geographical position of the gateway or gateways on a graphical user interface, so that the gateway or gateways can be managed more easily and clearly, and an evaluation or display of the transmitted process and/or diagnostic data of the individual field devices can be presented more accurately and clearly.

Furthermore, the present embodiment relates to a method for assigning an access authorization for a mobile operating device to a field device, the method comprising the following steps: providing a gateway; receiving an access authorization for an operating device from a (e.g. central) authorization assignment unit; storing the access authorization in a memory device of the gateway; reading out the access authorization and transmitting the access authorization to the mobile operating device by an authorization assignment means of the gateway.

In the embodiment of a method, the transmission of the access authorization of the mobile operating device is carried out automatically as soon as the mobile operating device enters the receiving and transmitting area of the gateway. For example, if the first interface is a Bluetooth interface, communication between the gateway and the mobile operating device can be covered within a range of up to 50 m (depending on local conditions, such as visibility, pipes, concrete walls and the like) around the gateway. As mentioned above, the access authorization to a field device is only granted and remains effective under the condition that both the field device and the operating device are connected to the gateway.

Any device that is set up to read an access authorization from the gateway's memory device and transmit it to the operating device can be used as the gateway's authorization assignment means. This can be done, for example, by an appropriately set up or programmed microprocessor arrangement.

In the method according to an embodiment, an access authorization for an operating device is individualized and is selected from the following access authorizations: an access authorization limited to a specified time period; an access authorization limited to a specified selection of field devices; an access authorization limited to specified functions of a field device; and/or an access authorization limited to a specified spatial area. With regard to the access authorization limited to a spatial area, in particular, an access authorization expires or is blocked as soon as the mobile operating device is no longer located in the transmission and reception area of the gateway.

In particular by the fact that a respective access authorization for a respective mobile operating device can be assigned by a central authorization assignment unit, a substantially more flexible management of the different access authorizations can be provided, whereby an improved security management with respect to the accesses to the field devices can be provided by the proposed individualization of the respective access authorizations.

Access authorizations are only assigned by the gateway for field devices that are connected to the gateway via the third interface, e.g. the near field interface. The field devices connected to the gateway transmit the process, parameter and/or diagnostic data, whereby the gateway stores these data and transmits them to a central data processing unit. The gateway transmits its position data to the authorization assignment unit and/or the central data processing unit.

Finally, the present disclosure relates to a system for assigning an access authorization for a mobile operating device to a field device, the system comprising: at least one gateway; at least one mobile operating device; at least one field device; and at least one authorization assignment unit, e.g. cloud-based. As explained above, such a system for the assignment of an access authorization for a mobile operating device to a field device with the above-mentioned components allows, on the one hand, the assignment of an access authorization to a mobile operating device to be handled much more flexibly. Furthermore, it is possible to embed the assignment of access authorization in an automated procedure. Furthermore, the risk of unauthorized access to a field device can be considerably reduced.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1 shows a schematic view of a system;

DETAILED DESCRIPTION

In the following, a detailed description of FIG. 1 is provided, which shows a schematic view of a system 1 for assigning access authorization for a mobile operating device 2, 3 to a field device 4, 5.

The system 1 comprises a gateway 6, whereby the gateway 6 in the shown embodiment comprises a first interface for wireless communication with a field device 4, 5 and a second interface for communication with a centrally arranged authorization assignment unit 7.

The first interface in the shown embodiment is a close-range interface, which is provided in particular by a Bluetooth interface or a Wireless Local Area (WLAN) interface.

The transmission-reception range of the first interface is indicated as area 8 in the shown embodiment. In the shown embodiment, the transmitting/receiving range 8 of the first interface is circular, whereby transmitting/receiving range 8 of the first interface can be configured differently depending on the transmitting/receiving technology used. As shown in FIG. 1, the field devices 4, 5 are located in the transceiver area 8 of the first interface of the gateway 6.

In the embodiment, the second interface is an Ethernet interface or a mobile radio interface which provides a communication channel with the central authorization assignment unit 7. In the shown embodiment, the communication to the authorization assignment unit 7 is provided by means of a mobile radio interface 9, whereby in the shown embodiment, a so-called data cloud 10 is interposed. Such a data cloud 10 can provide receiving, storage and/or transmission functions.

In the shown embodiment, the gateway 6 is still connected to a data processing unit 11 by means of the second interface, whereby mobile radio connections 9 and the intermediate data cloud 10 can also be used here.

In the transceiver area 8, which is provided by the first interface, the gateway 6 assigns respective access authorization for the mobile operating unit 2, which is located in the transceiver area 8 of the gateway 6. For this purpose, the authorization assignment unit 7 transmits an access authorization for a mobile operating device 2, 3 to the gateway 6 via the second interface. In the gateway 6, the access authorization for a mobile operating device 2, 3 is first stored in a memory/storage device and transmitted to the mobile operating device 2, 3 by means of an authorization assignment unit to the respective operating device 2, 3 via the first interface so that the mobile operating device 2, 3 can then access one or more of the field devices 4, 5.

The access authorization transmitted by the authorization assignment unit 7 and stored in the gateway 6 is adapted/individualized to the respective operating device 2, 3, i.e. advantageously, no standardized access authorizations are assigned but access authorizations adapted to the respective operating devices 2, 3. In particular, the following access authorizations can be selected from the following access authorizations which can each be provided individually or in combination to a mobile operating device 2, 3: an access authorization limited to a specified time period; an access authorization limited to a specified selection of field devices 4, 5; an access authorization limited to one or more specified functions of a field device 4, 5; and/or an access authorization limited to a specified spatial area within the transceiver area 8.

Advantageously, the gateway 6 and the mobile operating device 2, 3 are configured and set up in such a way that a respective access authorization for one of the mobile operating devices 2, 3 is then transferred to the mobile operating device 2, 3 as soon as a mobile operating device 2, 3 is placed in the transmitting/receiving area 8 of the first interface of the gateway 6. In FIG. 1, the mobile operating device 2 is within the transmit-receive area 8 of the gateway 6 and the mobile operating device 3 is outside the transmit-receive area 8 of the gateway 6.

In the shown embodiment, the gateway 6 is also connected to the field devices 4, 5 located in the transceiver area 8, so that data can also be exchanged between the gateway 6 and the field devices 4, 5.

Furthermore, the field devices 4, 5 can also be networked with each other, for example via the Bluetooth interfaces of the field devices 4, 5. This not only allows data exchange between the field devices 4, 5, but also the possibility of connecting further field devices to the gateway 6 although they are located outside the transceiver area 8 of the gateway by using one of the field devices 4, 5 located within the transceiver area 8 as a so-called transceiver bridge. In addition, this makes it possible to provide different communication paths via the different field devices 4, 5 to the gateway 6. This can be advantageous if, for example, the signal quality between the gateway 6 and one of the field devices 4, 5 fluctuates or is not sufficiently strong.

In the embodiment, in which the gateway 6 is connected to both the mobile operating device 2, 3 and the respective field devices 4, 5 via the wireless communication interface, it is possible to provide access authorization for a mobile operating device 2, 3 depending on whether the mobile operating device 2, 3 is connected to the gateway 6 and/or the field devices 4, 5. In the embodiment shown in FIG. 1, an access authorization for the field device 2 would thus be transferred by the gateway 6, whereby the maintenance of the access authorization of the mobile operating device 2 depends on the maintenance of a connection to the gateway 6 and/or to the field devices 4, 5. The mobile operating device 3 located outside the transceiver area 8 has not yet received an access authorization by the gateway 6 and only receives it when the operating device 3 moves into the transceiver area 8 of the gateway 6. An access authorization for the operating device 3 is automatically transferred from the gateway 6 by the authorization assignment means. In contrast, an access authorization assigned by the gateway 6 can be withdrawn or blocked as soon as a operating device 2, 3 leaves the transceiver area 8 of the gateway 6.

In the shown embodiment, the gateway 6 is also used to receive and store process, parameter and/or diagnostic data from the field devices 4, 5 so that they can be transmitted to the central data processing unit 11.

By means of a gateway 6 it is thus possible to provide a flexible and, moreover, secure administration of individualized access authorizations for mobile operating devices 4, 5, and that, if possible, the access authorizations can be transmitted individually and automatically to respective operating devices 2, 3.

Furthermore, a system 1 provides the possibility to centrally manage a multitude of gateways 6 by means of a central authorization assignment unit 7, whereby FIG. 1 shows a transceiver area 12 of another gateway for illustration purposes. The additional gateway can be located anywhere.

The spatial extension and size of the respective transceiver area 8 of a gateway 6 can be adapted by using different interfaces. In addition, it is usually easy to equip an existing system with a gateway 6, since most field devices 4, S are already equipped with appropriate short-range communication devices, such as Bluetooth interfaces, anyway.

The invention claimed is:

1. A gateway for assigning an access authorization for a mobile operating device to a field device, comprising:
 a first interface configured to wirelessly communicate with the mobile operating device;
 a second interface configured to communicate with an authorization assignment device;
 a memory device configured to store an access authorization of the mobile operating device transmitted by the authorization assignment device; and
 authorization assignment circuitry configured to read the access authorization of the mobile operating device from the memory device and to transmit the access authorization to the mobile operating device via the first interface,
 wherein the access authorization for the mobile operating device is individualized and is one or more of access authorizations selected from a group consisting of:
 an access authorization limited to a specified time period,
 an access authorization limited to a predetermined selection of field devices,
 an access authorization limited to specified functions of the field device, and
 an access authorization limited to a defined spatial area.

2. The gateway according to claim 1, wherein the first interface is a Bluetooth interface or a Wireless Local Area (WLAN) interface.

3. The gateway according to claim 1, wherein the second interface is selected from a group consisting of a wired Ethernet interface, a mobile radio interface, a low-power wide area network (LPWAN) interface, and a long range wide area (LoRaWAN) interface.

4. The gateway according to claim 1, further comprising a third interface configured to communicate with the field device.

5. The gateway according to claim 4, wherein access authorizations are assigned only for field devices which are connected to the gateway via the third interface.

6. The gateway according to claim 4, wherein the third interface and the memory device are respectively configured to receive and store process, parameter and/or diagnostic data from the field devices.

7. The gateway according to claim 6, further comprising a fourth interface configured to communicate with processing circuitry that is configured to transmit the process and/or diagnostic data of the field devices to the processing circuitry.

8. The gateway according to claim 1, further comprising position determining circuitry configured to communicate position data of the gateway to the authorization assigning device and/or processing circuitry.

9. A method for assigning an access authorization for a mobile operating device to a field device, comprising:
 receiving an access authorization for the mobile operating device from an authorization assignment device of a gateway including a first interface configured to wirelessly communicate with the mobile operating device, a second interface configured to communicate with the authorization assignment device, a memory device configured to store an access authorization of the mobile operating device transmitted by the authorization assignment device, and authorization assignment circuitry configured to read the access authorization of the mobile operating device from the memory device and to transmit the access authorization to the mobile operating device via the first interface;
 storing the access authorization in the memory device; and
 reading out the access authorization and transmitting the access authorization to the mobile operating device by authorization assignment circuitry, wherein the access authorization for the mobile operating device is individualized and is one or more of access authorizations selected from a group consisting of:

an access authorization limited to a specified time period;

an access authorization limited to a predetermined selection of field devices;

an access authorization limited to specified functions of a field device; and an access authorization limited to a defined spatial area.

10. The method according to claim 9, wherein access authorizations are only issued for field devices which are connected to the gateway via a third interface.

11. The method according to claim 9, further comprising receiving and storing, by the gateway, process, parameter and/or diagnostic data from the field device and transmits them to processing circuitry.

12. The method according to claim 9, further comprising, transmitting, by the gateway, position data of the gateway to the authorization assignment device and/or processing circuitry.

13. A system for assigning an access authorization for at least one mobile operating device to at least one field device, comprising:

at least one gateway according to claim 1;

the at least one mobile operating device;

the at least one field device; and the at least one authorization assignment device.

* * * * *